Jan. 26, 1960  E. R. CZERLINSKY ET AL  2,922,949
AUTOMATIC HYSTERESIS LOOP RECORDER
Filed Sept. 27, 1956  3 Sheets-Sheet 1
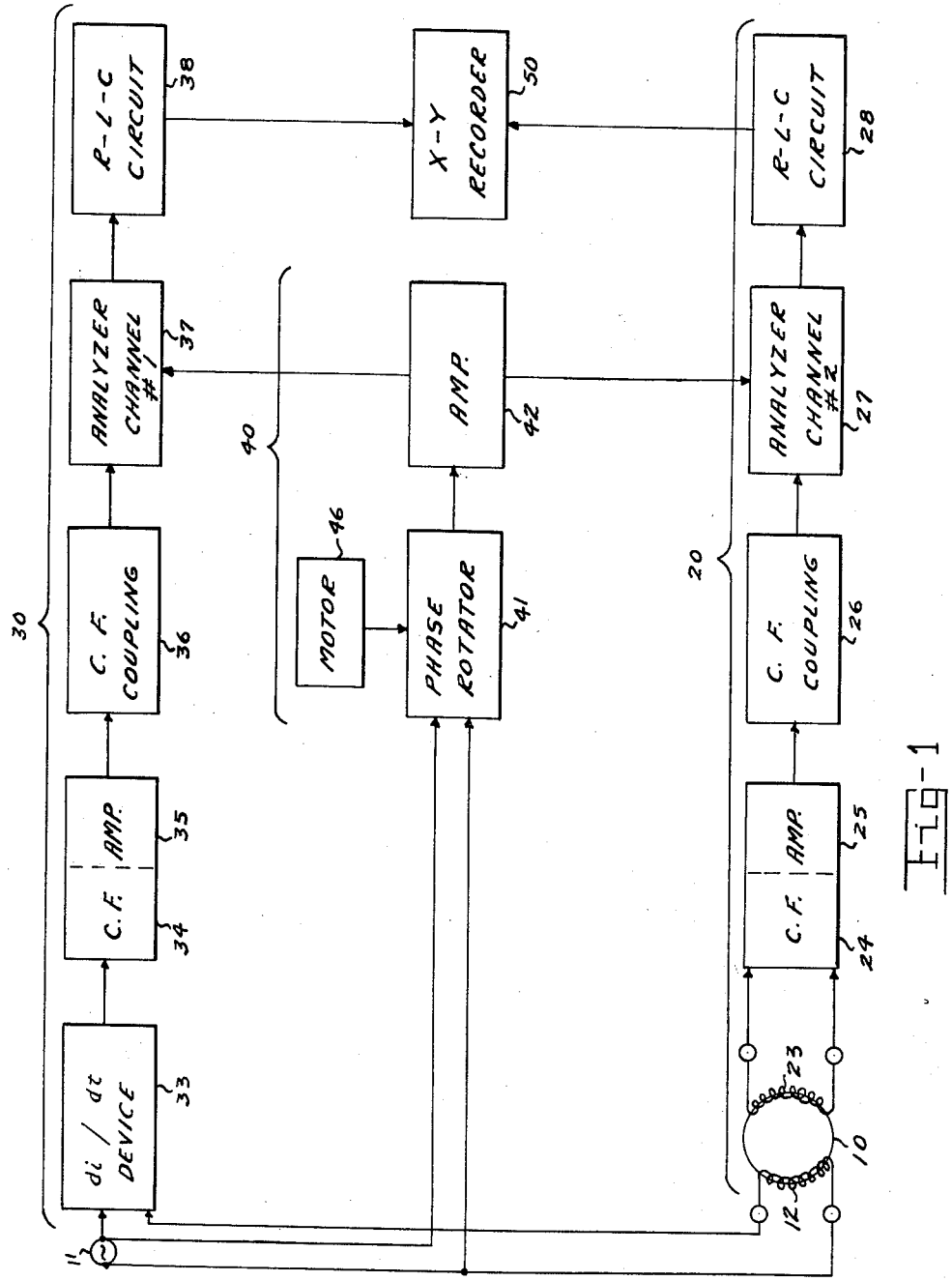
INVENTORS
ERNST R. CZERLINSKY
RAYMOND A. MacMILLAN
BY
ATTORNEY
AGENT

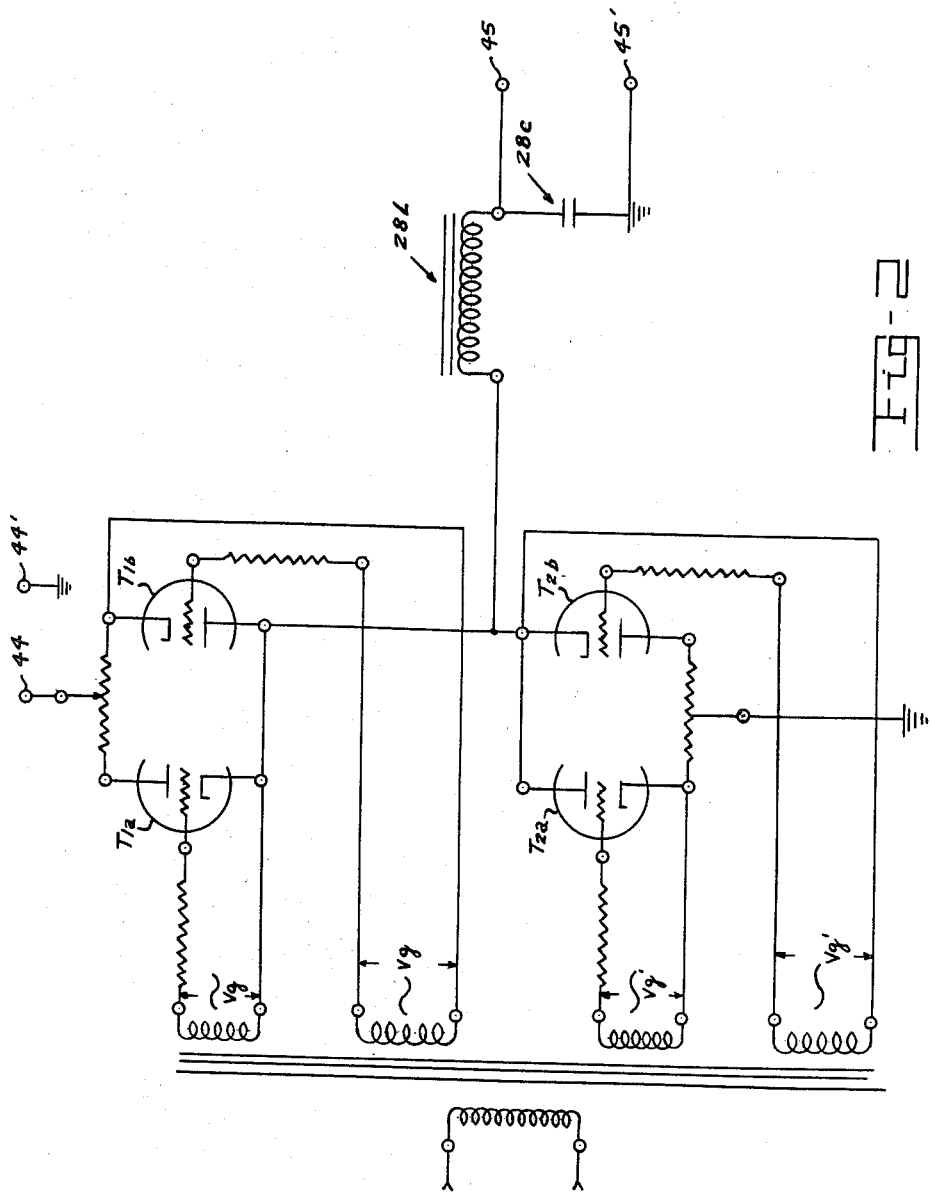

INVENTORS
ERNST R. CZERLINSKY
RAYMOND A. MACMILLAN

United States Patent Office 2,922,949
Patented Jan. 26, 1960

2,922,949

AUTOMATIC HYSTERESIS LOOP RECORDER

Ernest R. Czerlinsky, Arlington, and Raymond A. MacMillan, Greenwood, Mass., assignors to the United States of America as represented by the Secretary of the Air Force Application September 27, 1956, Serial No. 612,569

2 Claims. (Cl. 324—40)

(Granted under Title 35, U.S. Code (1952), sec. 266)

The invention described herein may be manufactured and used by or for the United States Government for governmental purposes without payment to us of any royalty thereon.

This invention relates to an apparatus for automatically recording on a chart the relation between two physical quantities such as the magnetic flux B induced in a sample and the A.C. magnetizing force H applied to said sample.

A further object is to provide an apparatus which avoids the use of mechanical switches and the consequent frequency limitations.

A further object is to provide a device which has a high input impedance and which has coupling circuits which introduce no waveform distortion or spurious D.C. components that would affect the accuracy of the device.

These and other objects are accomplished by providing a system which has two channels, one for measuring the flux induced in a sample and the other for measuring the magnetizing force and an X–Y recorder for recording the output of the two channels.

The conventional method for determining the magnetic flux B induced in a sample by a magnetizing force H is based on measuring the voltage induced in the turns of a winding surrounding the sample.

The voltage induced in such a winding is proportional to the derivative of the flux with respect to time. In order to get the value of the flux B integration is necessary.

One method for performing the integration is to use an instrument in which the positive and negative values of current are averaged in a highly damped galvanometer for one half period of the A.C. magnetizing current. The half period segment is shifted step by step over the entire cycle of the magnetizing current to get discrete values of flux B. In this system the flux B and the magnetizing force H must be measured separately and then the two sets of data must be hand-plotted.

In the device of the subject invention half period segments of the magnetizing current are also shifted over the entire period of the magnetizing current. However the device of the subject invention employs electronic switches for shifting the half period segment, RLC circuits for the averaging means and a two channel X–Y pen recorder attached to the averaging circuits for plotting the B–H hysteresis loop.

Fig. 1 is a block diagram of a measuring and recording device in accordance with the present invention.

Fig. 2 is a schematic wiring diagram of an analyzer channel in accordance with the present invention.

Figure 4:
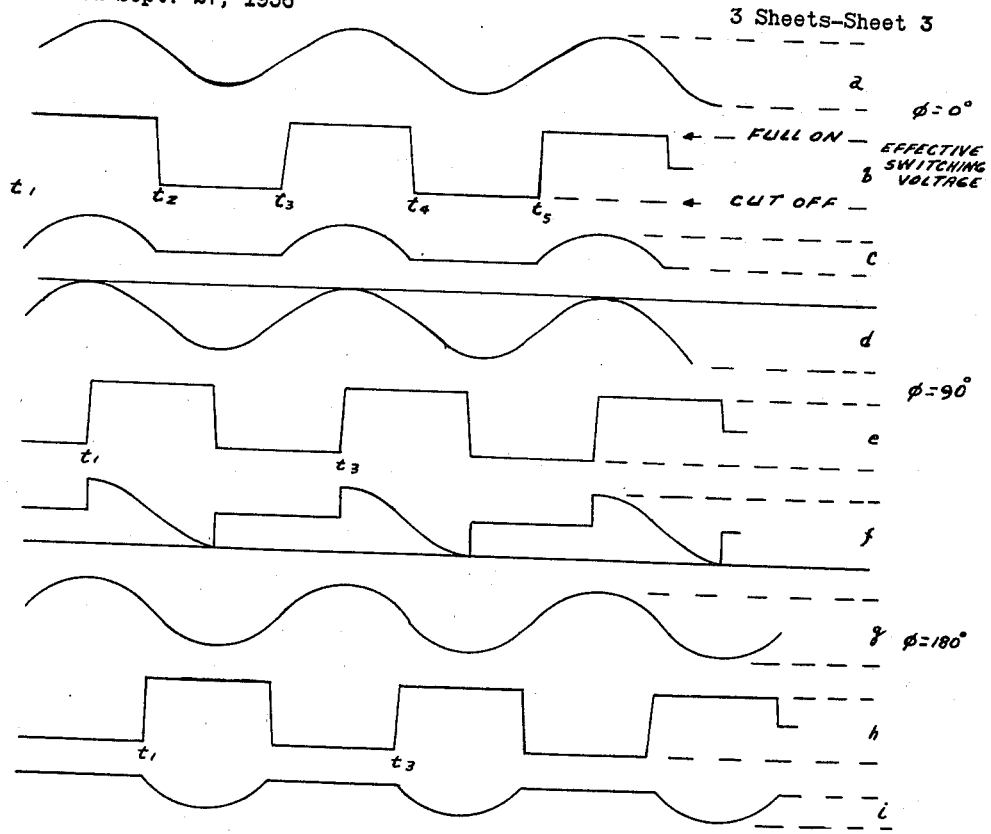
Fig. 4 shows waveforms for illustrating the operation of the analyzer channel of Fig. 2.

Referring to Fig. 1 of the drawing the device consists generally of a frequency source 11, which may have a frequency range of from 50 to 5000 c.p.s., a circuit 20 for measuring the magnetic flux induced in a sample 10, a circuit 30 for measuring the magnetizing force, a phase rotator circuit 40 and an X–Y recorder 50.

Frequency source 11 supplies the magnetizing force to the sample 10 by way of winding 12. The voltage $V_s$ induced in the secondary winding 23 is proportional to the derivative of the magnetic flux B induced in the core by the magnetizing force H. The voltage across winding 23 is applied to an analyzer channel 27 through a cathode follower 24, an amplifier 25 and a cathode follower coupling circuit 26. The switching and stepping of the half period segments are accomplished by the cooperation of the analyzer channel and the phase rotator.

The operation of the analyzer channel 27 and the phase rotator 41 is best explained with reference to Fig. 2 and Fig. 3.

Figure 3:
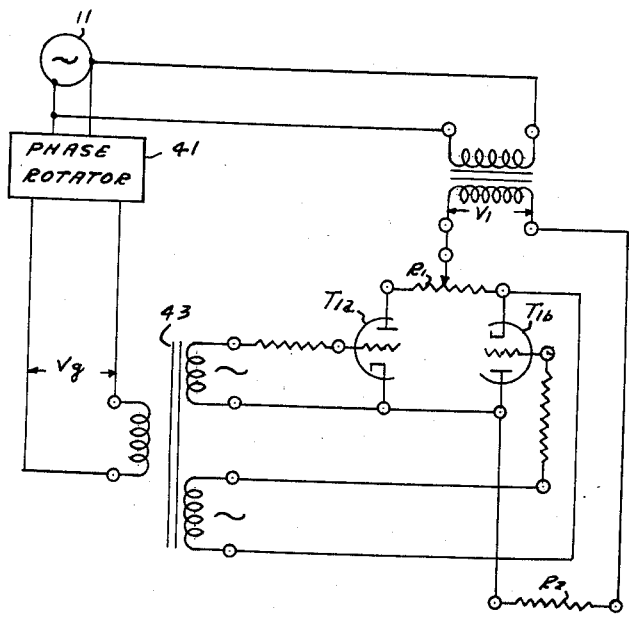
Fig. 3 is a schematic wiring diagram of a circuit to aid in the explanation of the operation of the analyzer channel of Fig. 2.

Referring first to Fig. 3, tube $T_{1a}$ has its cathode connected directly to the anode of tube $T_{1b}$ and its anode connected to the cathode of $T_{1b}$ through a resistor $R_1$. With no external voltage applied, a certain number of electrons will be emitted from each cathode by thermal emission. Due to the tube connections these electrons will cause a current to circulate between the two tubes and no current will flow through $R_2$, if the potentiometer slide is adjusted for balance. However if a voltage source is added in series with $R_2$ the tubes will become unbalanced with more current flowing in one tube than in the other and the difference will flow in $R_2$. When an A.C. voltage $V_1$ is connected in series with $R_2$ a corresponding A.C. current will flow in $R_2$.

If then an alternating voltage $V_g$ is applied in identical phase to the control grids of tubes $T_{1a}$ and $T_{1b}$ through a transformer 43, or other source, both tubes will be driven to full conduction during the positive half cycle of said alternating grid voltage and to cutoff during the negative half cycle. Thus either tube $T_{1a}$ or $T_{1b}$ is made conducting for one half cycle of grid voltage and both are cut off during the following half cycle. If voltages $V_g$ and $V_1$ are obtained from the same power supply the current $I_r$ through $R_2$ is proportional to the voltage $V_1$ during the conducting times $t_1$–$t_2$, $t_3$–$t_4$ etc. as shown in Fig. 4c. The current is zero during the times $t_2$–$t_3$, $t_4$–$t_5$, etc.

The phase difference between $V_1$ and $V_g$ determines the segment of voltage $V_1$ that causes the current to flow in $R_2$ during the time $t_1$–$t_2$, $t_3$–$t_4$ etc. When the phase difference is zero the current $I_r$ is as shown in Fig. 4c and will have an average value equal to $A/\pi$. With the phase difference equal to 90° the current $I_r$ will be as shown in Fig. 4f and will have an average value equal to zero. With the phase difference equal to 180° $I_r$ will be as shown in Fig. 4i and will have an average value equal to $-A/\pi$. In the general case when a voltage containing a fundamental and odd harmonics is applied, the average current produced by the fundamental is:

$$i_{1\,av} = \frac{1}{T}\int_{t_1}^{t_2} I_1 \sin \omega t\, dt = -\frac{I_1}{\omega T}\cos \omega t\Big|_{t_1}^{t_2}$$

And the average produced by the $n$th harmonic is:

$$i_{n\,av} = \frac{1}{T}\int_{t_1}^{t_2} I_n \sin n\omega t\, dt = -I\frac{I_n}{n\omega T}\cos n\omega t\Big|_{t_1}^{t_2}$$

Then if the conducting time $t_2 - t_1 = T/2$ the average currents are:

$$i_{1\,av} = \frac{I_1}{\pi}\cos \omega t,\ i_{n\,av} = \frac{I_n}{n\pi}\cos n\omega t$$

where $\omega t_1$ represents the phase angle between $V_1$ and $V_g$.

The phase difference between voltage $V_1$ and $V_g$ can be swept continuously through phase angles of from 0 to 360° by a phase rotator 41. The phase rotator should receive its energizing current from the same frequency supply that supplies $V_1$ and may be driven by adjustable speed motor.

Referring now to Fig. 2 wherein resistor $R_2$ of Fig. 3 is replaced by an L-C circuit, the inductance 28L, condenser 28C and tubes $T_1$ and $T_2$ make up an R-L-C circuit, with the distributed R being the sum of the resistance of the inductance, resistances of tubes $T_{1a}$ and $T_{1b}$ and connected circuit.

When a sinusoidal voltage of the same frequency as $V_g$ is applied to terminals 44 and 44' with a phase difference between the two voltages equal to zero, the direct (D.C.) voltage at terminals 45 and 45' rises to a value of $2/\pi$ times the amplitude of the voltage at terminals 44 and 44', if $\omega_{LC} = 1/\sqrt{LC} \ll \omega$ and if there is no discharge during the cutoff time, $\omega$ being the frequency for switching tubes $T_{1a}$ and $T_{1b}$ between full conducting and cutoff. With $L=400$ h. $C=400$ m$\mu$f. and $R=15,000$ ohms, condenser 28C will charge to 99% of its final amount in about 70 seconds.

If a second set of tubes $T_{2a}$ and $T_{2b}$ are provided having a voltage $V_g'$ applied to their grids which is from the same source as $V_g$ but which is 180° out of phase with respect to $V_a$, these tubes will conduct during the times that tubes $T_{1a}$ and $T_{1b}$ are cut off and the voltage at terminals 45 and 45' rises to a value not greater than $1/\pi$ times the amplitude of the voltage at terminals 44 and 44'. Since tubes $T_{2a}$ and $T_{2b}$ will conduct during the time that tubes $T_{1a}$ and $T_{1b}$ are cut off, the energy stored in the choke 28L will in a large part be transferred to the condenser 28C, thereby shortening the charging time for the condenser to approximately 4 sec. The final voltage on the condenser then will be a D.C. voltage with a negligible superimposed alternating voltage. As can be seen the speed of the phase rotator must be made slow enough to allow the condenser 28C to reach the proper value of charge for each phase position of the phase rotator.

Then if the voltage applied to terminals 44 and 44' is the output of cathode follower 26 and $V_g$ is the output of phase rotator 41, the D.C. voltage across terminals 45 and 45' is proportional to the flux B.

A D.C. voltage proportional to the magnetizing force H is obtained in a circuit which is substantially the same as the circuit for obtaining the flux B. The circuits in blocks 34 through 38 in circuit 30 of Fig. 1 are identical with the circuits in blocks 24 through 28 of circuit 20. Since the tubes in analyzer 37 and the RLC circuit 38 act as an integrator, the time derivative of H must first be obtained before the signal is fed to the analyzing channel 37. A differentiating device 33, which may be a differentiating amplifier, is used to give the derivative of H. The input to the differentiating amplifier is a voltage derived from current flowing in a small resistance in series with the primary winding 12.

The outputs of circuits 28 and 38 are fed to a two-channel X-Y pen recorder 50 which continuously records the coordinate values of flux B and magnetizing force H, to thereby give a B-H hysteresis loop.

There is thus provided an apparatus for plotting a B-H hysteresis loop for a sample and which can plot B-H hysteresis loops for a wide range of frequencies.

While the invention has been described with reference to a particular embodiment, it will be understood that numerous changes may be made without departing from the general principles and scope of the invention.

What is claimed is:

1. An apparatus for recording the relation between the magnetizing force applied to a sample and the flux induced in the sample comprising: a variable frequency source, means for connecting said source to said sample, means connected to said sample for obtaining a voltage proportional to the derivative of the magnetic flux induced in said sample, a first switching circuit, means for applying said voltage to said first switching circuit, a second switching circuit, means for obtaining the time derivative of the magnetizing force applied to said sample, means for applying the output of the last named means to said second switching circuit, a phase rotator driven by a slow speed motor and operated from said frequency source for controlling the switching operation of said switching circuits to shift half period segments of the voltage applied to each switching circuit over the entire cycle of the magnetizing current, an averaging means connected to each of said switching circuits for producing D.C. voltages proportional to the flux induced in the sample and to the magnetizing force applied to the sample, an X-Y recorder, means for applying the D.C. voltage proportional to flux to the recorder to operate the recorder in the Y direction and means for applying the D.C. voltage proportional to the magnetizing force to the recorder to operate the recorder in the X direction.

2. An apparatus for producing a hysteresis loop for a sample comprising: a first channel for producing a D.C. voltage proportional to the magnetizing force applied to the sample, a second channel for producing a D.C. voltage proportional to the flux induced in said sample, each of said channels having a switching and averaging circuit therein, said switching and averaging circuits having therein a first pair of tubes and a second pair of tubes, said first pair of tubes having the anode of one connecting through a potentiometer resistor to the cathode of the other and the cathode of the one directly connected to the anode of the other, an external circuit connected between a sliding tap on the potentiometer and the cathode of said tubes, said external circuit having an A.C. voltage source and an inductance-capacitance load therein, said second pair of tubes being connected together in the same manner as said first pair of tubes and being connected in circuit with the inductance-capacitance load, means for applying a voltage to the grids of said first and said second pair of tubes, means for changing the phase between the grid voltage and the voltage in said external circuit, means for making the phase difference between the grid voltage of said first pair of tubes and said second pair of tubes equal 180°, an X-Y recorder, means for connecting the voltage across the condenser in the said first channel to the recorder to operate the recorder in the X direction and means for connecting the voltage across the condenser in the said second channel to the recorder to operate the recorder in the Y direction.

References Cited in the file of this patent

UNITED STATES PATENTS

| | | |
|---|---|---|
| 1,574,350 | Johnson | Feb. 23, 1926 |
| 2,283,742 | Leonard | May 19, 1942 |
| 2,610,230 | Wiegand | Sept. 9, 1952 |
| 2,760,144 | Crandon et al. | Aug. 21, 1956 |
| 2,762,965 | Walker | Sept. 11, 1956 |
| 2,805,390 | Patrick | Sept. 3, 1957 |

OTHER REFERENCES

An Instrument for the Automatic Recording of Hysteresis Loops, Journal of Scientific Instruments, July 1956; pages 265–268.